No. 761,871. PATENTED JUNE 7, 1904.
J. D. BRAUN.
WIRE TIGHTENER.
APPLICATION FILED SEPT. 9, 1903.
NO MODEL.
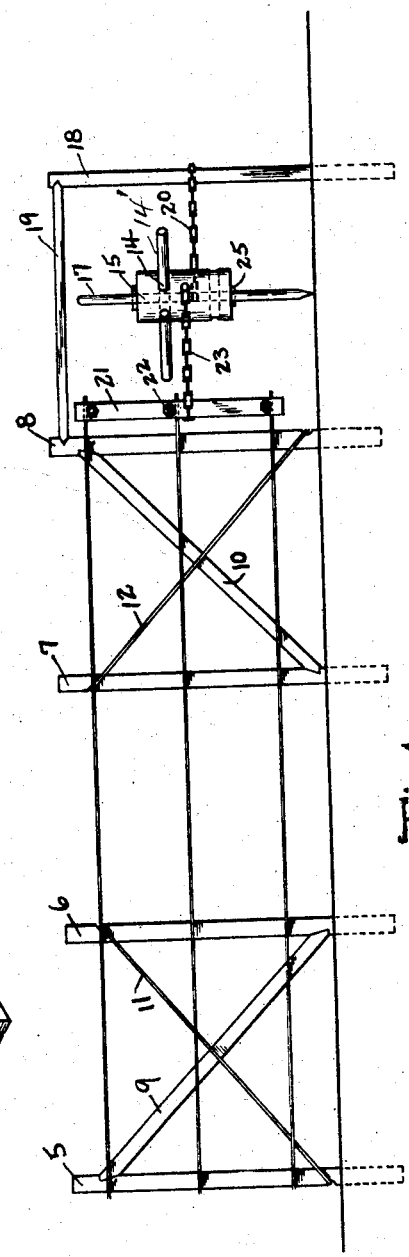
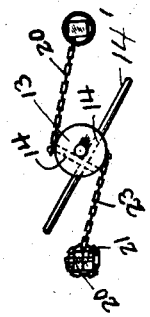
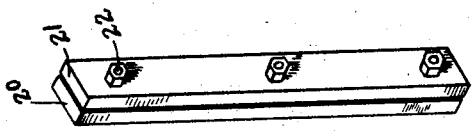
Witnesses
Charles Morgan.
Fred C. Jones
Inventor
J. D. BRAUN.
By Chandler & Chandler
Attorneys No. 761,871. Patented June 7, 1904.

UNITED STATES PATENT OFFICE.

JACOB D. BRAUN, OF FULTON, KANSAS.

WIRE-TIGHTENER.

SPECIFICATION forming part of Letters Patent No. 761,871, dated June 7, 1904.

Application filed September 9, 1903. Serial No. 172,453. (No model.)

*To all whom it may concern:*

Be it known that I, JACOB D. BRAUN, a citizen of the United States, residing at Fulton, in the county of Bourbon, State of Kansas, have invented certain new and useful Improvements in Wire-Tighteners; and I do hereby declare the following to be a full, clear, and exact description of the invention, such as will enable others skilled in the art to which it appertains to make and use the same.

This invention relates to wire-stretchers; and it has for its object to provide a mechanism which may be used in connection with wires of different kinds and which may be operated to stretch or tighten a plurality of wires simultaneously.

A further object of the invention is to provide a stretcher which will be durable and cheap.

In the drawings forming a portion of this specification, and in which like numerals of reference indicate similar parts in the several views, Figure 1 is an elevation showing the present stretcher in active position. Fig. 2 is a top plan view of the winding-drum, the wire-clamp, and the posts with which the drum is connected. Fig. 3 is a detail perspective view of the wire-clamp.

Referring now to the drawings, there is shown a portion of the fence comprising posts 5, 6, 7, and 8, of which the posts 5 and 8 represent end posts, which are braced to the adjacent posts by means of the braces 9 and 10 and with which they are further connected by the tie-wires 11 and 12.

The stretcher proper consists of a winding-drum 13, through which are formed sockets 14, designed to receive interchangeably a lever 14' for rotating the drum. A longitudinal passage 15 is formed through the drum, and in this passage is received a bar 17, on which the drum may rotate, the lower end of the bar being pointed, so that it may be readily driven into the ground. In connection with the drum is employed a post 18, which is set in the ground and is braced from the post 8 by means of the beam or brace 19, and around this post is fastened one end of a chain 20, the opposite end of which is fastened to the winding-drum, so that when said drum is rotated the chain is wound thereon and the drum is drawn toward the post. In connection with the winding-drum and the post to which it is connected there is employed a wire-clamp consisting of the two plates 20' and 21, which may be wholly or partly of wood or metal and which are connected by means of bolts 22, so that they may be clamped upon the wires which are engaged between them. A chain 23 is attached around the central portions of the clamping-plates and at its opposite end is attached to the winding-drum, so that when the drum is rotated both chains will be wound thereon and the wire-clamp will be moved forcibly toward the post 18 to stretch the wires connected thereto.

In the use of the stretcher the wires to be stretched are first attached to the end post 5 and after being roughly laid out along the line of the fence are engaged with the wire-clamp, as above described. The bar on which the drum rotates does not remain in the ground during the stretching operation, and to prevent displacement of the drum longitudinally of the bar pins 25 are engaged through the latter above and below the drum.

What is claimed is—

The combination of a wire-stretcher comprising a bar, a drum removably and rotatably mounted upon the bar and having a plurality of sockets extending transversely therethrough, a lever adapted for interchangeable engagement with the sockets of the drum, and chains connected to the drum to be wound thereon and having hooks at their outer ends, of a wire fence, a clamp engaging the wires of the fence, a post at a distance from the fence and a brace adapted to removably engage the upper ends of the said post and the adjacent post of the fence.

In testimony whereof I affix my signature in presence of two witnesses.

JACOB D. BRAUN.

Witnesses:
 C. C. GOSS,
 W. H. GREEN.